May 3, 1960 L. KELTZ 2,935,676

SENSING DEVICE FOR DIODE RECTIFIERS

Filed Feb. 13, 1957 2 Sheets-Sheet 1

INVENTOR.
LAURENCE KELTZ

BY Ostrolenk, Faber, Gerb & Soffen
ATTORNEYS

May 3, 1960 L. KELTZ 2,935,676

SENSING DEVICE FOR DIODE RECTIFIERS

Filed Feb. 13, 1957 2 Sheets-Sheet 2

INVENTOR.
LAURENCE KELTZ

BY Ostrolenk, Faber, Gerb & Soffen
ATTORNEYS 2,935,676
Patented May 3, 1960

2,935,676

SENSING DEVICE FOR DIODE RECTIFIERS

Laurence Keltz, Malvern, Pa., assignor to I-T-E Circuit Breaker Company, Philadelphia, Pa., a corporation of Pennsylvania Application February 13, 1957, Serial No. 639,968

6 Claims. (Cl. 321—11)

My invention relates to fault sensing means for metallic or semiconductor rectifiers and more specifically relates to sensing means for indicating the conduction of a reverse current beyond a predetermined value of any of a plurality of rectifiers.

When high current capacity rectifier systems are formed of metallic or semiconductor type of diodes, the required current ratings are met by using a plurality of parallel connected diode elements. In a similar manner, the required voltage rating of the system may be met by using a plurality of parallel connected diode elements in series with one another.

Therefore, it is understood that a very large number of diode elements may be used in a single rectifier system.

When any individual diode element fails, it will operate to short circuit the other diodes connected in parallel therewith. Accordingly, the other groups of parallel connected diodes which are connected in series with the first mentioned group will have to assume a larger portion of the full inverse voltage of the system. This will accelerate failure of the other diodes until the complete system will be taken off the line.

Hence, it is desirable to have an indication of the failure of any individual diode element along with an identification of that element. Still further, it is even more desirable to have an indication of an element which is about to fail prior to the failure thereof along with an identification of that element.

The principle of my invention is based on the realization that the inverse current of a diode element at a given inverse voltage increases prior to a complete failure of the diode element, and comprises the placing of a transformer which could be of the saturable core type in series with each diode element. The saturable core transformer is normally saturated in the forward direction by the forward D.-C. current of its respective diode element, and is biased so that a flux change is not accomplished by the core until the inverse current of the respective diode element increases beyond a predetermined value. A secondary winding of each of the saturable core transformers is then connected to initiate the operation of some type of annunciator device which gives a warning of the failure or impending failure of a diode element along with an identification of the diode element. If desired, trip means for operating protective circuit means for disconnecting the rectifier system from the line may also be initiated by the operation of any of the saturable core reactors.

Accordingly, a primary object of my invention is to provide novel means for indicating the fault or impending fault of any diode element of a rectifier system.

Another object of my invention is to initiate the operation of indicating means responsive to conduction of an inverse current beyond a predetermined value by a respective rectifier element.

Another object of my invention is to utilize transformer means which have their flux reversed responsive to the conduction of a reverse current beyond a predetermined value by a respective rectifier element.

A still further object of my invention is to connect the primary winding of a biased transformer means in series with each diode element of a rectifier system whereby the flux of said transformer means is reversed only when the reverse current of said diode element exceeds a predetermined value, the output of said transformer means actuating an indicating device individual to its respective diode member.

Still another object of my invention is to provide individual sensing means which are energized by a predetermined diode reverse current to cause operation of protective circuit means for removing the rectifier system from the line.

These and other objects of my invention will become apparent from the following description taken in conjunction with the drawings in which.

Figure 1:
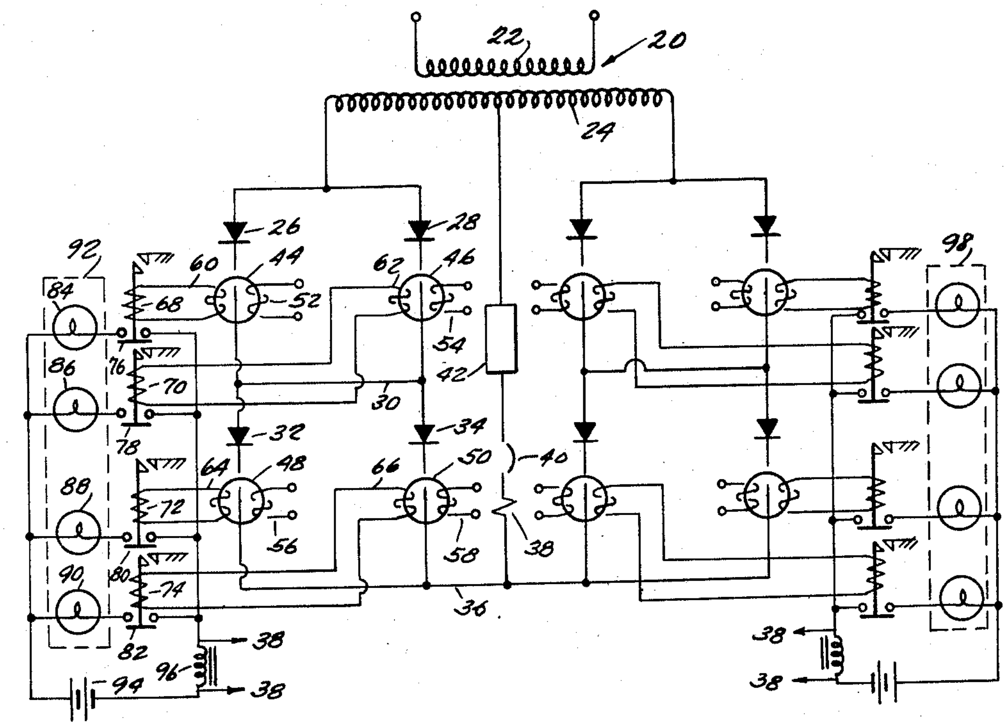
Figure 1 shows my novel invention applied to a single phase full wave rectifier system.

Referring now to Figure 1, the A.-C. transformer 20 comprises a primary winding 22 which is connected to an A.-C. source of power and a center tapped secondary winding 24. One side of secondary winding 24 is connected to one side of parallel connected diode elements 26 and 28, their other side being connected to a common bus 30. Parallel connected diode elements 32 and 34 are then connected to common bus 30, their other side being connected to common bus 36 which is connected to one side of the trip element 38 of circuit interrupter 40. Circuit interrupter 40 is then connected to one side of load 42, the other side being connected to the center tap of secondary winding 24.

Clearly, the other (right hand) side of transformer secondary winding 24 is connected through a similar arrangement of diode elements to form a single phase, full wave rectifier system of the well known type. The current rating of this rectifier system is achieved by connecting as many diode elements as required in parallel, while the voltage rating is achieved by connecting as many diode sections in series as required to support the full inverse voltage.

In the case of Figure 1, two diode elements per phase are connected in parallel and two are connected in series. the common conductor 30 tending to establish equal voltage distribution between the various diode elements. However, any desired number of elements could be connected in series or parallel. Furthermore, these diode elements could be either of the metallic or semiconductor type of diode, it being understood that the word diode used herein would include the base-collector circuit of a transistor type device.

Figures 2, 3, 4:
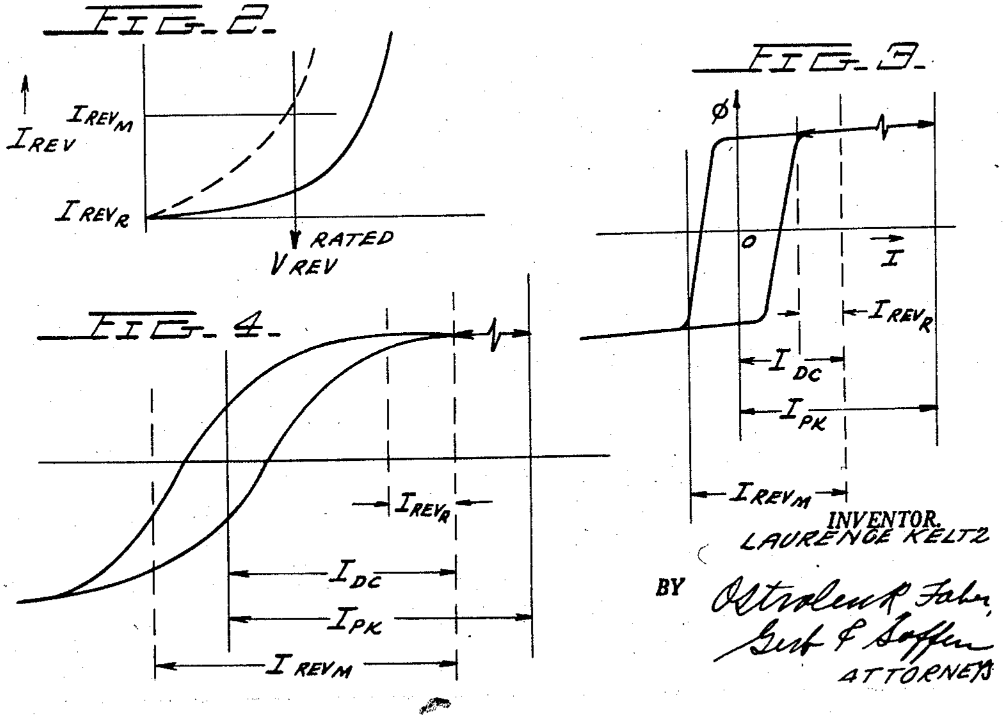
Figure 2 shows the reverse voltage-current characteristics of the diode elements of Figure 1.
Figure 3 shows the flux-current characteristics of the core of Figure 2 when the saturable type.
Figure 4 shows the flux-current characteristics of the core of Figure 2 when of the normal transformer iron type.

During operation of the rectifier circuit above described, the inverse voltage-current characteristics of the diode elements should be that shown in the solid line of Figure 2. If, for some reason, one of the diode elements becomes faulty and is about to fail, or assume an extremely low inverse impedance, the voltage current characteristic may first shift to that shown in the dotted line of Figure 2 wherein the inverse current of the diode has increased.

The object of the instant invention is to produce a warning and indicate which diode element carries a reverse current which is greater than some predetermined value $I_{rev.m.}$ at rated inverse voltage $V_{rated}$, thereby allowing identification and replacement of the faulty diode element.

To achieve this end, I have found that I can associate a transformer device with each diode element, which transformer device produces an output to an indicating device responsive to high reverse current in its respective diode element.

Figure 1 shows these transformer devices as including magnetic cores 44, 46, 48 and 50 which have primary windings formed by conductors which conduct the reverse current of diodes 26, 28, 32 and 34 respectively, D.-C. biasing windings 52, 54, 56 and 58 which are energized from an appropriate D.-C. source (not shown) and secondary or output windings 60, 62, 64 and 66.

Clearly, a similar transformer device arrangement is provided for the right hand phase of the rectifier system.

Each of output windings 60, 62, 64 and 66 are connected to relay coils 68, 70, 72 and 74 respectively. Each of relay coils 68, 70, 72 and 74 are the coils of any desired type relay which is of the normally open type and will be maintained closed upon the energization of the relay. Thus, the contact elements 76, 78, 80 and 82 associated with relay coils 68, 70, 72 and 74 respectively (shown in the normally open position) will, upon energization of their respective relay coils, be closed and maintained in the closed position by the ratchet type latch means shown at the top of each relay coil.

Each of contact elements are connected in series with a respective light bulb 84, 86, 88 and 90 which, if desired, could be mounted in a panel as indicated by the dotted box 92. Each of the light bulb contact groups are then connected in parallel with the series connection of D.-C. voltage source 94 and fault indicating choke 96.

In a manner similar to that above described, each of the diode elements of the right hand phase of Figure 1 are individually associated with respective light bulbs which could be mounted in a panel as indicated by the dotted box 98.

The operation of the circuit of Figure 1 will now be considered, assuming that the transformer device cores 44, 46, 48 and 50 are of material which exhibits a relatively square hysteresis characteristic as shown in Figure 3.

Each of cores 44, 46, 48 and 50 are biased at windings 52, 54, 56 and 58 respectively to a value $I_{D.-C.}$ as seen in Figure 1, which is of such value as to assure that any reverse current below some predetermined amount $I_{rev.m.}$ (see Figures 2 and 3) will not drive its respective core through a flux change. Thus, during normal current carrying conditions, the net current applied to each respective core will be that shown in Figure 3 between current $I_{D.-C.}$—$I_{rev.r.}$ and current $I_{pk}$ which is the forward peak current carried by the associated diode element.

When, however, the reverse current of the diode element increases to $I_{rev.m.}$ (Figures 2 and 3), the associated core will go through its complete flux change whereby an output voltage will appear on its output winding to activate its associated relay and indicating light.

By way of example, assume that diode 26 of Figure 1 is about to fail and its reverse current increases beyond the value $I_{rev.m.}$ During the reverse voltage cycle, the core 44 will execute a flux change and an output voltage will appear on winding 60. This output voltage will then appear across relay coil 68 to close contact 76 whereby voltage source 94 is connected across indicating light 84 to illuminate this light or give rise to other warning means.

Accordingly, maintenance personnel are informed of the presence of an element which may eventually fault, as well as the exact identification of this element.

If desired, current responsive element 96 which is energized responsive to the closing of any of relay contacts 76, 78, 80 or 82 may be connected to trip element 38 of circuit interrupter 40 to automatically open the load circuit until the faulty element is replaced.

Obviously, the same operation described above for diode element 26 and indicating light 84 obtains for each of diode elements 28, 32, and 34 and their respective indicating lights 86, 88, and 90 as well as for the diode elements and respective indicating lights of the right hand phase.

Furthermore, similar operation will proceed if the diode element is immediately short-circuited rather than achieving this condition slowly in the beginning as described hereinabove. However, the same important result of immediately knowing which element is damaged before other elements are banned is achieved.

The above described description of operation has assumed the use of relatively square hysteresis loop material for the transformer devices. However, it is to be noted that the cheaper type transformer iron having a characteristic shown in Figure 4 could be utilized so long as the bias $I_{D.-C.}$ is sufficient to prevent any substantial flux change due to the reverse current $I_{rev.r.}$ (Figures 2 and 4). In all other respects, the operation of the two transformers will be substantially identical.

Figures 5, 6:
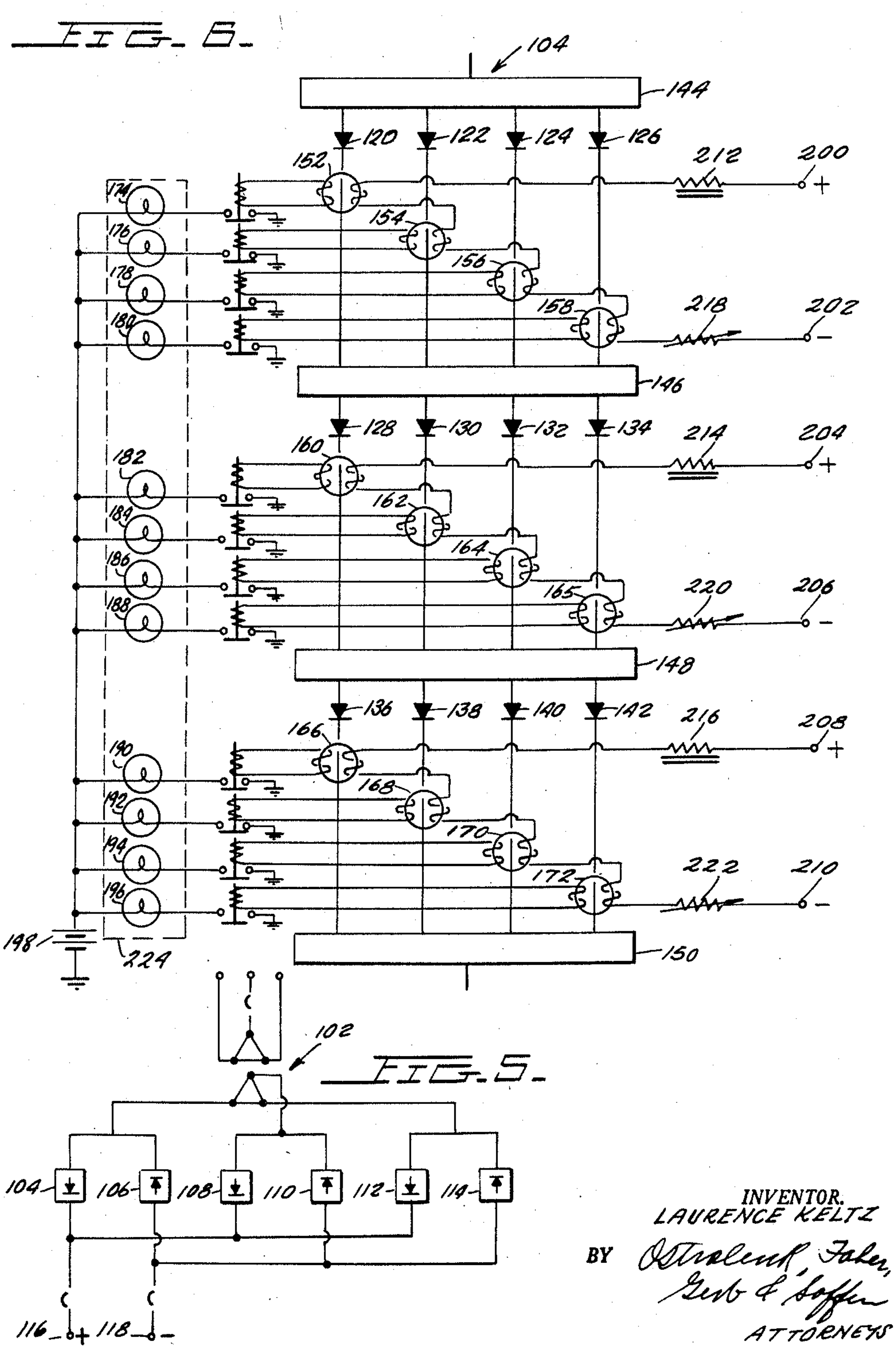
Figure 5 shows a three phase full wave rectifier system.
Figure 6 shows how one phase of the system of Figure 5 may be modified in accordance with my novel invention.

Figures 5 and 6 show the extension of my novel invention to a three phase, full wave rectifier system wherein each positive and negative phase contains three series connected sets of four parallel connected diode elements.

The rectifier system is set forth in Figure 5 and comprises the delta-delta transformer 102 which is to be energized from a three phase source of power. The secondary winding of transformer 102 is then connected to the schematically shown rectifier units 104, 106, 108, 110, 112 and 114 in the well known manner to produce D.-C. energization at terminals 116 and 118. Each of rectifier units 104 through 114 are constructed in an identical manner and are connected for conduction in alternate directions.

Phase 104 is specifically set forth in Figure 6, this rectifier unit, as well as rectifier units 116—114 being constructed in accordance with my novel invention.

As seen in Figure 6, three sets of parallel connected diode elements 120, 122, 124, 126 and 128, 130, 132, 134 and 136, 138, 140, 142 respectively are connected in series by virtue of common buses 144, 146, 148 and 150 respectively.

Conductors associated with diodes 120, 122, 124, 126, 128, 130, 132, 134, 136, 138, 140 and 142 act as the primary winding of iron cores 152, 154, 156, 158, 160, 162, 164, 165, 166, 168, 170 and 172 respectively which may be of the type set forth in either of Figures 3 or 4. Each of the transformers are then provided with output windings for energizing relay means associated with indicating lights 174, 176, 178, 180, 182, 184, 186, 188, 190, 192, 194 and 196 from D.-C. voltage source 198. Biasing windings are similarly provided for each of the transformer means and include D.-C. power means applied at terminals 200—202, 204—206, and 208—210 which are connected in series with smoothing chokes 212, 214 and 216 respectively and variable resistors 218, 220 and 222 respectively.

The operation of the diode unit shown in Figure 6 is identical to that set forth for Figure 1, the lights 174 through 196, which could be mounted in a panel 224, being energized responsive to conduction of reverse current higher than some predetermined value by diodes 120 through 142 respectively.

In a similar manner the diodes of each of the other phases will have indicating lights individually associated therewith and mounted in other sections of an indicating panel which is easily monitored by automatic devices or maintenance personnel.

Although I have described preferred embodiments of my novel invention, many variations and modifications will now be obvious to those skilled in the art, and I prefer therefore to be limiited not by the specific disclosure herein but only by the appended claims.

I claim:

1. In a rectifying system comprising a plurality of parallel connected diode elements; a respective transformer means for each of said diode elements; each of said transformer means having a primary winding energized by the current flowing through their respective diode elements and a secondary winding connected to an indicating device identifiable with their said respective diode elements; each of said transformer means being constructed to be driven through a flux change by the reverse current of their said respective diode elements only when said reverse current exceeds a predetermined value; each of said indicating means being energizable when their respective transformer means executes a flux change to thereby indicate that their respective diode element carries a reverse current beyond said predetermined value.

2. In a rectifying system comprising a plurality of sets of pluralities of parallel connected diode elements; a respective transformer means for each of said diode elements; each of said transformer means having a primary winding energized by the current flowing through their respective diode elements and a secondary winding connected to an indicating device identifiable with their said respective diode elements; each of said transformer means being constructed to be driven through a flux change by the reverse current of their said respective diode elements only when said reverse current exceeds a predetermined value; each of said indicating means being energizable when their respective transformer means executes a flux change to thereby indicate that their respective diode element carries a reverse current beyond said predetermined value.

3. In a rectifying system comprising a plurality of parallel connected diode elements; a respective transformer means for each of said diode elements; each of said transformer means having a primary winding energized by the current flowing through their respective diode elements and a secondary winding connected to and indicating device identifiable with their said respective diode elements; biasing means for each of said transformer means; said biasing means being constructed to prevent flux change in the cores of each of said transformer means when the reverse current of their said respective diode elements is below a predetermined value; each of said indicating means being energizable when their respective transformer means executes a flux change to thereby indicate that their respective diode element carries a reverse current beyond said predetermined value.

4. In a rectifying system comprising a plurality of sets of pluralities of parallel connected diode elements; a respective transformer means for each of said diode elements; each of said transformer means having a primary winding energized by the current flowing through their respective diode elements and a secondary winding connected to an indicating device identifiable with their said respective diode elements; biasing means for each of said transformer means; said biasing means being constructed to prevent flux change in the cores of each of said transformer means when the reverse current of their said respective diode elements is below a predetermined value; said transformer means core being constructed of saturable type material exhibiting a square loop type hysteresis characteristic.

5. In a rectifying system comprising a plurality of sets of pluralities of parallel connected diode elements; a respective transformer means for each of said diode elements; each of said transformer means having a primary winding energized by the current flowing through their respective diode elements and a secondary winding connected to an indicating device identifiable with their said respective diode elements; biasing means for each of said transformer means; said biasing means being constructed to prevent flux change in the cores of each of said transformer means when the reverse current of their said respective diode elements is below a predetermined value; said transformer means core being constructed of normal transformer iron material.

6. In a rectifying system comprising a plurality of parallel connected diode elements; a respective transformer means for each of said diode elements; each of said transformer means having a primary winding energized by the current flowing through their respective diode elements and a secondary winding connected to an indicating device identifiable with their said respective diode elements; biasing means for each of said transformer means; said biasing means being constructed to prevent flux change in the cores of each of said transformer means when the reverse current of their said respective diode elements is below a predetermined value; each of said indicating means being energizable when their respective transformer means executes a flux change to thereby indicate that their respective diode element carries a reverse current beyond said predetermined value; protective circuit interrupting means for said rectifying system having trip unit means; a current responsive element energizable responsive to energization of any of said indicating means; said trip unit being connected to said current responsive means to be energized for operation of said protective circuit interrupting means responsive to energization of any of said indicating means.

References Cited in the file of this patent

UNITED STATES PATENTS

| | | |
|---|---|---|
| 2,057,531 | Livingston | Oct. 13, 1936 |
| 2,188,436 | Hugus | Jan. 30, 1940 |
| 2,441,484 | Goldstein | May 11, 1948 |
| 2,728,043 | Derr et al. | Dec. 20, 1955 |

FOREIGN PATENTS

| | | |
|---|---|---|
| 67,742 | Netherlands | April 16, 1951 |